United States Patent [19]

Onodera

[11] Patent Number: 4,725,938
[45] Date of Patent: Feb. 16, 1988

[54] HIGH VOLTAGE RESONANT DC/DC CONVERTER

[75] Inventor: Toshihiro Onodera, Tokyo, Japan

[73] Assignee: Kabushiki Kaisha Toshiba, Kawasaki, Japan

[21] Appl. No.: 912,657

[22] Filed: Sep. 29, 1986

Related U.S. Application Data

[63] Continuation-in-part of Ser. No. 652,577, Sep. 20, 1984, abandoned.

[30] Foreign Application Priority Data

Sep. 26, 1983 [JP] Japan ................................. 58-177376

[51] Int. Cl.$^4$ ............................................ H02M 3/315
[52] U.S. Cl. ........................................ 363/28; 363/68; 378/105
[58] Field of Search ..................... 363/27, 28, 67–69, 363/64; 378/104, 105, 110, 112

[56] References Cited

U.S. PATENT DOCUMENTS

| | | | |
|---|---|---|---|
| 3,197,691 | 7/1965 | Gilbert .................................. | 363/28 |
| 3,419,786 | 12/1968 | Brane ..................................... | 363/68 |
| 4,318,164 | 3/1982 | Onodera et al. ...................... | 363/21 |
| 4,339,704 | 7/1982 | McSparran et al. ............... | 363/69 X |
| 4,366,532 | 12/1982 | Rosa et al. ............................ | 363/69 |
| 4,383,292 | 5/1983 | Onodera et al. ....................... | 363/21 |
| 4,386,395 | 5/1983 | Francis, Jr. ........................... | 363/27 |
| 4,480,298 | 10/1984 | Fry ......................................... | 363/28 |

FOREIGN PATENT DOCUMENTS 0058399 8/1982 European Pat. Off. .
0106482 4/1984 European Pat. Off. .

OTHER PUBLICATIONS

G. Breitling et al.; "Polyphos 300-A Medium-Frequency X-Ray Generator", Electromedica, 2/81.

*Primary Examiner*—Peter S. Wong
*Attorney, Agent, or Firm*—Oblon, Fisher, Spivak, McClelland & Maier

[57] ABSTRACT

A high voltage DC/DC converter including a voltage resonance switching circuit formed by a coreless transformer, a GTO thyristor switching element connected between the primary winding of the transformer and a D.C. source, and a voltage resonance capacitor connected in parallel to the switching element. A rectifier circuit is connected to the secondary winding of the transformer to rectify an output current from the transformer circuit. The resonance frequency of the parallel resonance circuit made of the resonance capacitor and the coreless transformer is selected to be the frequency of that component of the current supplied to the circuit through the switching element, which has a greater amplitude than any other component of the current (including the fundamental frequency and other harmonic).

16 Claims, 9 Drawing Figures

HIGH VOLTAGE RESONANT DC/DC CONVERTER

This application is a continuation-in-part, of application Ser. No. 652,577, filed Sept. 20, 1984, now abandoned.

BACKGROUND OF THE INVENTION

1. Field of the Invention

This invention relates to a power source for supplying high voltage to a load and, more particularly, to a high voltage resonant DC/DC converter adapted as a power source for an X-ray tube, etc.

2. Description of the Prior Art

An X-ray tube is generally operated by high voltage ordinarily ranging between 100 and 400 KV, with a larger power consumption than 100 KW. With a conventional high voltage converter for supplying high voltage to a load such as an X-ray tube, the common technique used to derive the high voltage has been to step up a commercial power source by means of a transformer whose core is constructed of laminated silicon steel plates. Procurement of high voltage and high power from a commercial power source operated at a low frequency requires an extremely large transforemer, making it necessary to provide a large high voltage converter.

To cope with the above-mentioned difficulties, studies have been conducted in recent years to miniaturize the transformer and reduce the capacity of the power source for the high voltage converter by applying a converter having as high a switching frequency as several hundred Hz for power conversion. In the above-mentioned power conversion, a large power of, for example, 1,000 amperes is generally switched. Therefore, a high speed gate turn-off (GTO) thyristor, used as a switching element in the converter, can have its operation frequency only raised to a level of about 1 KHz, if its switching loss is taken into account. Consequently, a limitation is imposed on the miniaturization of the transformer, thereby unavoidably resulting in the enlargement of the high voltage generator. In the above-mentioned large power conversion, difficulties arise in elevating the operation frequency of the switching element in view of the switching loss which may take place. Consequently, the miniaturization of the transformer has been considered unrealizable, if the power transmission efficiency of the transformer is taken into account.

Since the core undergoes magnetic saturation, a limit is imposed on the transformer magnetic flux density B (magnetic saturation is reached at about 8,000 gauss in the case of a silicon steel plate and at about 3,000 gauss in the case of a ferrite plate). For the transmission of high power, the cross-sectional area of the core has to be enlarged. The above-mentioned magnetic saturation has also been regarded as one of the causes which prevents miniaturization of the transformer.

As seen from the foregoing description, the application of a large transformer results in the enlargement of the whole high voltage converter, thus requiring, a great deal of work and time in the transportation and installation of a large high voltage converter. Moreover, such a large high voltage converter imposes further limitations on the selection of a site for its installation.

SUMMARY OF THE INVENTION

It is accordingly an object of this invention to provide a high voltage resonant DC/DC converter which ensures the miniaturization of a transformer by applying a high operation frequency and the efficient conversion of high voltage and high power.

To attain the above-mentioned object, this invention provides a high voltage resonant DC/DC converter, wherein a switching element is connected between a D.C. source and the primary winding of a coreless transformer. A voltage resonance type switching circuit is provided by connecting a voltage resonance capacitor in parallel to the switching element or the primary winding of the coreless transformer. A rectifier circuit for rectifying an output current is connected to a secondary winding of the coreless transformer. The resonance frequency of the parallel resonance circuit made of the resonance capacitor and the coreless transformer is close to the frequency of that component of the current supplied to the circuit through the switching element, which has a greater amplitude than any other component of the current (including the fundamental frequency and other harmonics).

The high voltage resonant DC/DC converter of this invention offers the advantages that the efficient conversion of large power can be effected by utilizing voltage resonance with a higher frequency than, for example, 1 KHz, and the application of the aforementioned coreless transformer and high frequency operation permits the miniaturization of the transformer and, consequently, the miniaturization of the whole high voltage converter and its efficient operation. Since, the resonance frequency of the parallel resonance circuit made of the resonance capacitor and the coreless transformer is close to the frequency of that component of the current supplied to the circuit through the switching element, which has a greater amplitude than any other component of the current (including the fundamental frequency and other harmonics), the power can be transmitted from the primary winding of the transformer to the secondary winding thereof with a high efficiency.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
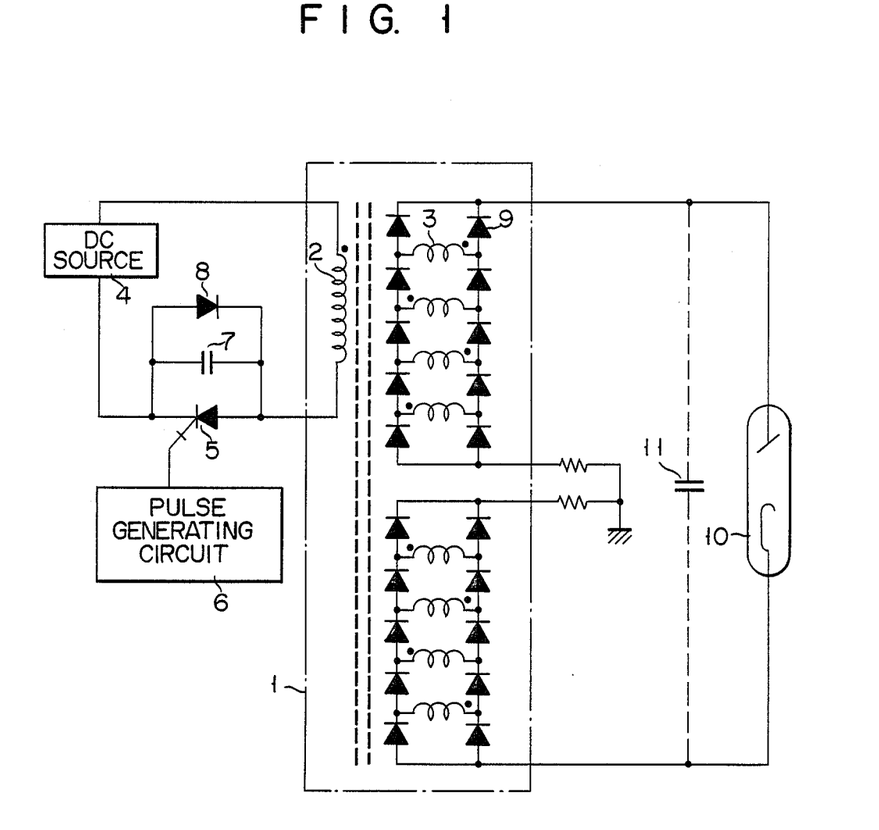
FIG. 1 is a circuit diagram of a high voltage resonant DC/DC converter according to a first embodiment of this invention.

Referring now to the drawings, wherein like reference numerals designate identical or corresponding parts throughout the several views, FIG. 1 illustrates a high voltage resonant DC/DC converter according to a first embodiment of this invention including transformer 1 having a primary winding 2 and a plurality of independent secondary windings 3 wherein the transformer 1 is coreless (namely, has an air core). A D.C. source 4 is formed of a rectifying power source for identifying and smoothing, for example, a commercial power source. Connected between a pair of output terminals of the D.C. source 4 is a series circuit consisting of the primary winding 2 of the transformer 1 and a GTO thyristor 5 acting as a switching element. The gate of the GTO thyristor 5 is supplied with an output control pulse from a control pulse generator 6. The GTO thyristor 5 is rendered conductive or non-conductive in response to the control pulse with a prescribed frequency of, for example, 10 KHz and a specified interval. A voltage resonance capacitor 7 is connected in parallel to the anode and cathode of the GTO thyristor 5. A dumper diode 8 is connected with opposite polarity in parallel to the anode and cathode of the GTO thyristor 5. The resonance frequency of the parallel resonance circuit made of resonance capacitor 7 and coreless transformer 1 is close to the frequency of that component of the current supplied to the circuit through GTO thyristor 5, which has a greater amplitude than any other component of the current (including the fundamental frequency and other harmonics). The foregoing description represents a voltage resonance switching circuit in which the primary winding 2 of the transformer 1 is used as a load.

Provided on the secondary side of the transformer 1 are a plurality of groups of rectifier diodes 9 connected in series in the same polarity direction. A plurality of secondary windings 3 are respectively connected between a junction of every two adjacent diodes constituting one group and a junction of every two corresponding adjacent diodes constituting another adjacent group. In this case, each secondary winding has a polarity opposite to that of the adjacent secondary winding, as indicated by a dot "." associated with the respective secondary windings. Thus, all the rectifier diodes and secondary windings jointly constitute a ladder-shaped circuit. The rectifier diodes collectively constitute a rectification circuit which eventually sums all the output currents from the plural secondary windings in the direction of the same polarity and performs full-wave rectification. An X-ray tube 10 is connected to said rectification circuit as a high voltage and high power load. The capacitor 11 shown in FIG. 1 represents a stray capacitive component remaining in the cable through which power is supplied from the transformer 1 to the X-ray tube 10, and acts as a smoothing capacitor for high frequency power.

Figure 2:
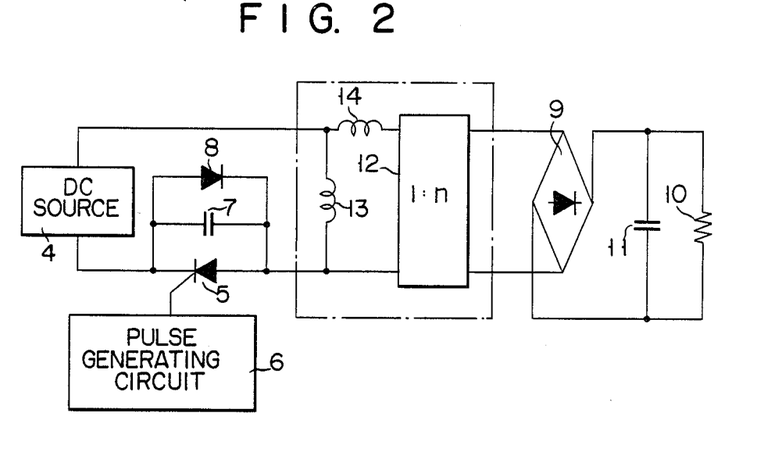
FIG. 2 is a theoretical equivalent circuit diagram of the circuit shown in FIG. 1.

Referring to the equivalent circuit of FIG. 2 corresponding to the high voltage generating circuit of FIG. 1, the coreless transformer 1 is equivalently constituted by an ideal transformer 12, exciting inductance 13, and leakage inductance 14 prevailing between the primary winding 2 and secondary winding 3.

Figure 4:
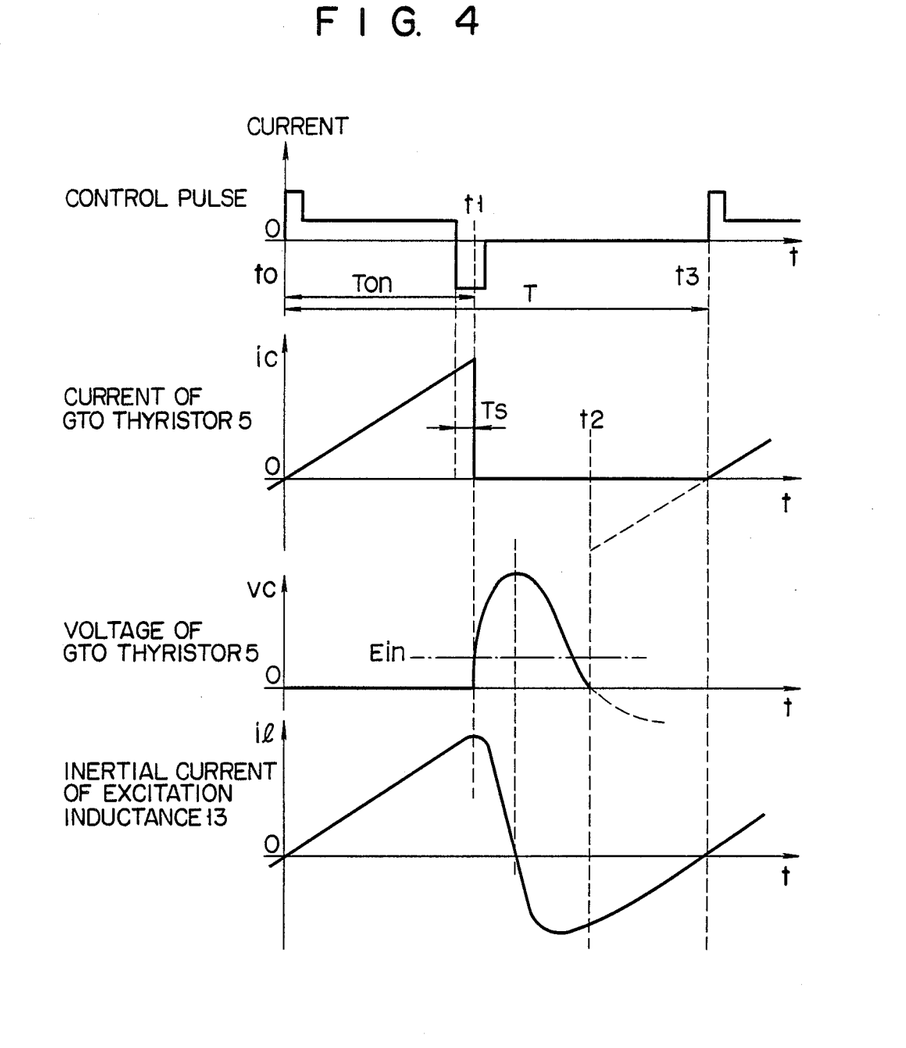
FIG. 4 is a waveform diagram indicating signal waves appearing in the various sections of the high voltage converter of FIG. 1.

Now let it be assumed in the above-mentioned arrangement of the subject high voltage generator that the GTO thyristor 5 is operated by a control pulse having such a wave as shown in FIG. 4; the GTO thyristor 5 is opened and closed for a prescribed period T, in which the thyristor 5 is rendered conducting for a specified period Ton, showing the stabilized circuit condition of the subject high voltage generator; the GTO thyristor 5 acts as an ideal switch which presents no resistance when rendered conducting, and presents an infinite resistance when rendered nonconducting; and the condition of voltage resonance is mainly defined by the voltage resonance capacitance 7 and leakage inductance 14. A description may now be made of the operation of the subject high voltage generator on the basis of the above-mentioned assumptions.

As seen from the waveform of the control pulse shown in FIG. 4, the GTO thyristor 5 fails to retain a state of saturated conduction, unless a gate current always runs through said GTO thyristor 5, and indicates a slight time lag (a storage period Ts) between the point of time at which a reverse bias nonconducting pulse is issued and the point of time at which the GTO thyristor 5 is rendered nonconductive. As used herein, the leakage inductance 14 is defined to mean an inductance as viewed from the primary side of the transformer 1 when the secondary winding 3 thereof is short-circuited.

Figure 3A:
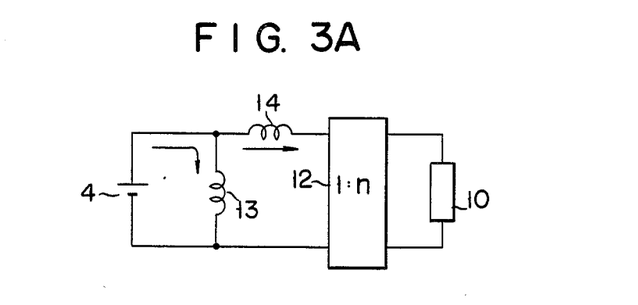
FIGS. 3A to 3C are schematic equivalent circuit diagrams representing the respective operation stages of the high voltage generator of FIG. 1.

When the GTO thyristor 5 is rendered conductive for a period Ton (t0 to t1), then the resultant equivalent circuit presents such an arrangement as shown in FIG. 3A. The exciting inductance 13 of the transformer 1 appears between both output terminals of the D.C. source 4. At this time, the ideal transformer 12 is connected to the prescribed one of the two output terminals of the D.C. source 4. Now let it be assumed that Lp represents the value of the exciting inductance 13; Le denotes the value of the leakage inductance 14; Ein shows the voltage of the D.C. source 4; and Eout indicates the average voltage of a power supplied to the X-ray tube 10. Then, the current ic running through the GTO thyristor 5 during the above-mentioned period may be expressed as follows:

$$ic(t) = \frac{Ein}{Lp} t + \frac{Ein - nEout}{Le} \cdot t,$$

where n sets forth the ratio which the number of turns of the primary winding of the transformer 1 bears to those of the secondary winding thereof, namely, the transformation ratio of the ideal transformer 12 of FIG. 2. During the aforementioned period, the current ic conducted through the GTO thyristor 5 linearly increases as indicated by the current waveform of FIG. 4.

Figure 3B:
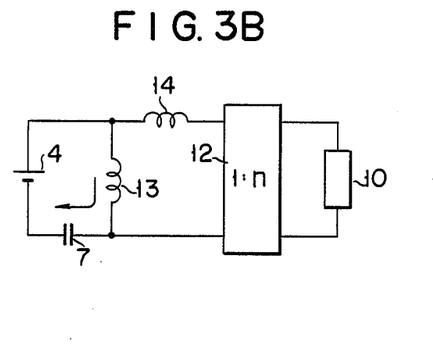
Figure 3C:
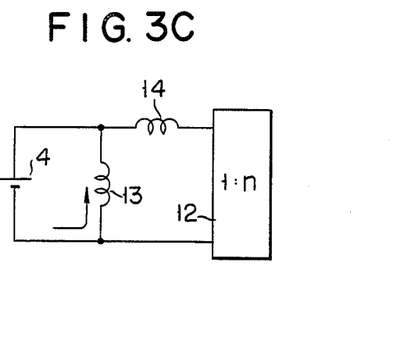

During the subsequent period (t1 to t2) which extends between the point of time at which the GTO thyristor 5 is rendered nonconductive and the point of time at which the diode 8 is rendered conducting, the equivalent circuit is as shown in FIG. 3B. Thus, the current flowing through the exciting inductance 13 and the current conducted through the leakage inductance 14, that is, an inertial current, and brought into the capacitor 7 for its charge. Consequently, the terminal voltage of the capacitor 7, namely, a voltage VC impressed across both terminals of the GTO thyristor 5 increases, while delineating a resonance as shown in FIG. 4. The voltage reaches a maximum level defined by the condition of resonance and later drops. The terminal voltage of the capacitor 7 tends to have a negative value, indicated by a broken line in FIG. 4, by the action of resonance after the terminal voltage VC again falls to zero at point at time t2. At this time, however, the diode 8 is rendered conductive by the forward bias. Therefore, during the period Td (t2 to t3) which lapses before the GTO thyristor 5 is again rendered conductive, the terminal voltage VC is retained at zero. An equivalent circuit during the above-mentioned period presents the arrangement of FIG. 3C. The inertial current il passing through the exciting inductance 13 retains a limited negative value as shown in FIG. 4, even when the terminal voltage VC of the capacitor 7 falls to zero, and flows to the D.C. source through the diode 8. The high voltage generator circuit embodying this invention is designed in such a manner that, as shown in FIG. 4, the inertial current il first falls to the negative side as mentioned above, and then regains a zero level at the termination of the switching period T, namely, in the proximity of the starting point of the succeeding switching period (when the switching element 5 is rendered conductive a second time). To realize the above-mentioned circuit arrangement, it is fundamentally advised to prescribe the constants of the various circuits. The high voltage generator of this invention not only involves the advised consideration but also carries out a self-stabilizing function. Therefore, the same displacement of timing, from the point of time at which the inertial current il regains a zero level, is automatically corrected by the circuit itself, which therefore tends to be stabilized, as shown in FIG. 4.

A description may now be made of the magnitude of the power which the subject high voltage generator supplies to the load 10. As seen from FIG. 4, the magnitude of said power is defined by the power Pin corresponding to a current supplied during the period Ton (t0 to t1), that is, the power supplied from the power source 4, and a return power Pret indicated by a current brought back to the power source 4. Therefore, the net power Pout supplied from the power source 4 to the load 10 is expressed as follows:

Pout=Pin-Pret.

Now let it be assumed that a current il returned to the power source 4 during a period Td (t2 to t3) is regarded as a current ic flowing back through the GTO thyristor 5. Then, the above-mentioned net transmitted power may be expressed by the following equation:

$$Pout = \frac{1}{T} \int_0^{Ton} \{ic(t) \cdot Ein\}dt$$

$$= \frac{1}{2T}\left( \frac{Ein^2(Ton^2 - Td^2)}{Lp} + \frac{nEout(Ein - nEout)}{Le}(Ton + Td)^2 \right).$$

As seen from the above equation, it is very effective to reduce the value Lp of the exciting inductance 13 and the value Le of the leakage inductance 14 for the object of increasing the transmitted power. In this connection, it will be noted that the above-mentioned inductance values Lp, Le primarily depend on the winding construction of the transformer 1.

A high voltage-resonant DC/DC converter embodying this invention offers the advantages that the application of the coreless transformer 1 enables not only the size of the transformer 1, and consequently the size of the whole high voltage DC/DC converter, to be reduced but also the inductance values Lp, Le to be reduced, ensuring the effective transmission of a large power. The coreless transformer 1 is also improved in its frequency response by broadening of the response frequency band and the coreless transformer facilitates the insulation of high voltage. Consequently, it is possible to eliminate the so-called coreloss of the transformer 1 and resolve various problems arising from, for example, magnetic saturation. Moreover, the high frequency switching operation and the miniaturization of the high voltage converter can be promoted. The resonance frequency of the parallel resonance circuit made of resonance capacitor 7 and coreless transformer 1 is close to the frequency of that component of the current supplied to the circuit through GTO thyristor 5, which has a greater amplitude than any other component of the current (including the fundamental frequency and other harmonics). When the current supplied to the resonance circuit has a sawtooth waveform as is shown in FIG. 4, the component of the second harmonic has the greatest amplitude. Since its resonance frequency has such a value, the resonance circuit operates such that the power can be transmitted from the primary winding of the transformer 1 to the secondary winding of the transformer 1 to the secondary winding thereof with a high efficiency.

The application of a coreless transformer generally tends to be accompanied with the drawback that a magnetic connection between the primary and secondary windings tends to be more weakened than when a core transformer is used. As described above, however, the coreless transformer 1 of the subject high voltage generator is constructed by dividing the secondary winding 3 into three sections. In this case, the divided sections of the secondary winding 3 of the coreless transformer 1 are wound about the outer periphery and/or the inner periphery of the primary winding 2. A good electromagnetic coupling is realized between both primary and secondary windings 2, 3. Since the transformer is operated at a high frequency, which is adapted to provide a strong electromagnetic coupling use of the coreless transformer 1 gives rise to substantially no decline in the electromagnetic coupling.

The present inventors manufactured four samples of the coreless transformer 1 whose Lps respectively were 20 μH, 40 μH, 80 μH and 160 μH under the condition of Le=0.5 Lp. A test was made of the high voltage converters embodying this invention, which respectively involved the four samples of the coreless transformer 1. determination was made of the relationship between the operation frequency f and the quantity of supplied power, Pout, which was observed under the condition of:

Ein=500 V,
Eout=150 KV,
n=1/500,
Ton/T=0.4,
Td/T=0.

Figure 5:
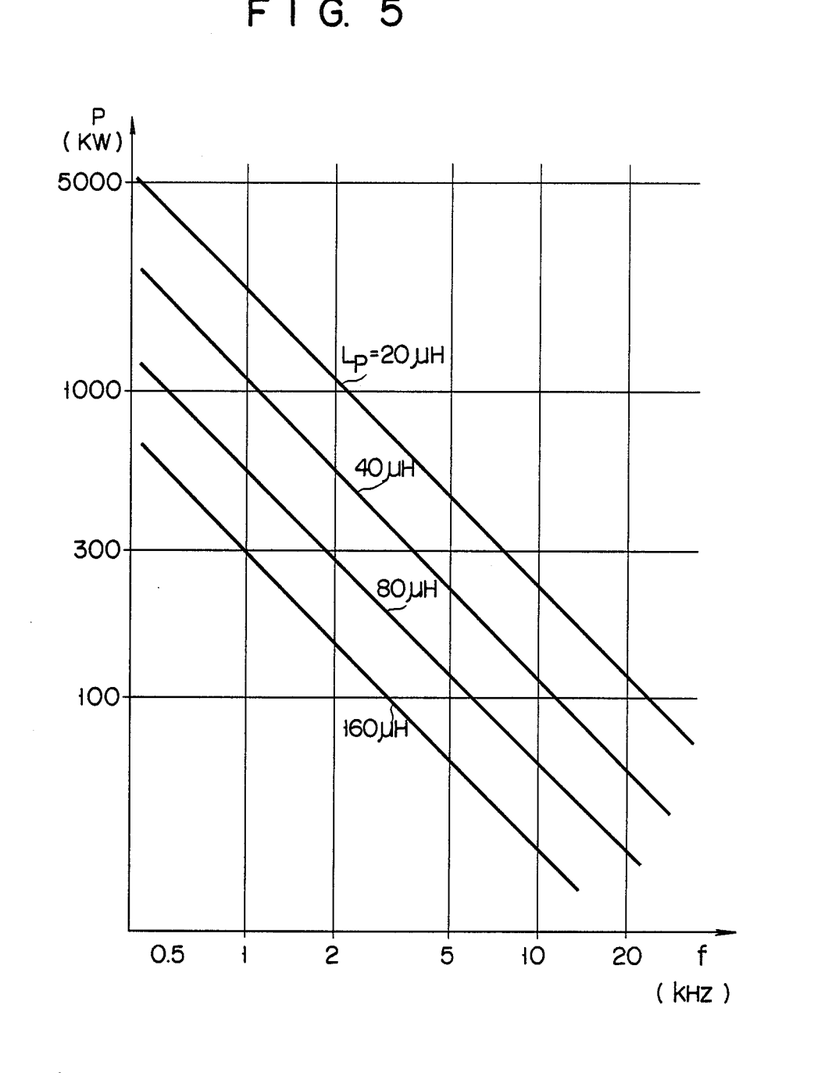
FIG. 5 is a graph illustrating the relationship between the operating frequency and the quantity of supplied power for different valves of transformer inductance, in a case a plurality of high voltage generators are formed with substantially the same construction as that of FIG. 1.

As a result, the relationships indicated in FIG. 5 were obtained. FIG. 5 proves that when a transformer 1 having Lp=160 μH is used produces a power Pout of for example, 300 KW, it is advised to set the operation frequency at 0.96 KHz. In the case of a transformer of Lp=80 μH, the operation frequency should advisably be set at 1.82 KHz. In the case of a transformer of Lp=40 μH, the operation frequency should advisably be set at 3.56 KHz. Finally, in the case of a transformer of Lp=20 μH, the operation frequency should preferably be set at 7.4 KHz. The result of the above-mentioned determination means that if the subject high voltage DC/DC converter is provided with a coreless transformer 1 which enables the LP of the exciting inductance 13 to be set at 20 to 30 μH, the converter can be operated at a higher frequency than, for example, 5 KHz even when the transmitted power is as large as 100 KW. In other words, when hundreds of kilowatts of power are transmitted with the high voltage DC/DC converter operated at a high frequency of several KHz units, it is necessary to employ a transformer 1 having Lp=20 to 30 μH. The high voltage resonant DC/DC converter of this invention, which uses the aforementioned coreless transformer, can attain the above-mentioned object.

As compared with the inductance of an air core (coreless) coil, the conventional transformer, which has a core consisting of laminated silicon steel plates and in which the core magnetic permeability is larger than 1, exhibits a larger inductance. When 30 turns of a wire are wound about a bobbin having a diameter of, for example, 60 mm, a coreless coil has an inductance as large as 40 μH. When, therefore, such a coil includes a core prepared from the above-mentioned laminated silicon steel plates, the resultant inductance is greatly increased.

As mentioned above, a high voltage generator embodying this invention, which involves a coreless transformer 1, offers the advantages that the transformer 1 can be miniaturized, and the converter can be operated at a high frequency, ensuring the effective transmission of a large volume of power. Since the resonance frequency of the parallel resonance circuit made of resonance capacitor 7 and coreless transformer 1 is close to the frequency of that component of the current supplied to the circuit through GTO thyristor 5, which has a greater amplitude than any other component of the current (including the fundamental frequency and other harmonics) the converter can achieve a high efficiency power transmission.

The operation frequency of the subject high voltage resonant DC/DC converter, the inductance of the transformer 1 and turns ratio of the primary winding to those of the secondary winding of the transformer 1 are determined in accordance with the required specification. However, these values should be determined such that the resonance frequency of the parallel resonance circuit made of resonance capacitor 7 and coreless transformer 1 is close to the frequency of that component of the current supplied to the circuit through GTO thyristor 5, which has a greater amplitude than any other component of the current (including the fundamental frequency and other harmonics). The power supply to a load can be controlled by varying either the period of a control pulse issued from the control pulse generator 6 to the GTO thyristor 5 or the pulse width (the timing in which the GTO thyristor 5 is intermittently rendered conducting), or both factors.

Obviously, the high voltage resonant DC/DC converter embodying this invention which is constructed as described above, is applicable as a power source for any other load than the X-ray tube 10. The switch element of the subject high voltage resonant DC/DC converter can be provided not only by the aforementioned GTO thyristor 5, but also by the so-called giant transistor, thyristor or any other electronic switch element having the same control function as the aforementioned elements. When, however, an electronic switch element, for example, a thyristor having no self-extinguishing function, is applied, it is of course necessary to provide an extinguishing circuit interlocking to be operative with the control pulse generator 6 for the purpose of effecting extinction.

Figure 6:
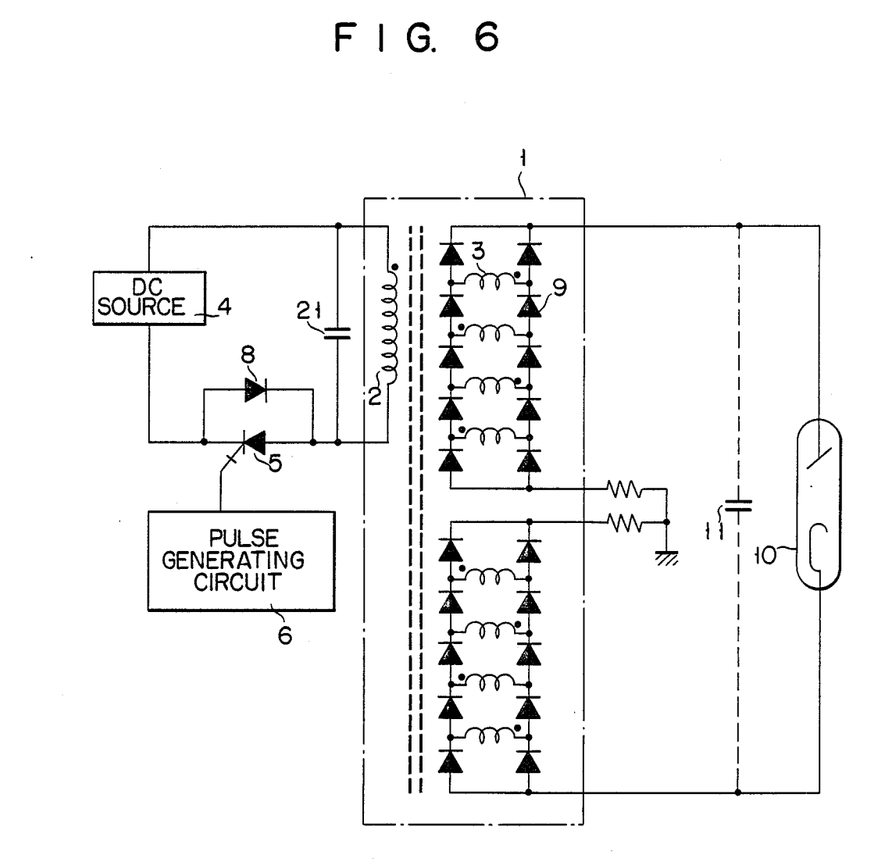
FIG. 6 is a circuit diagram of a high voltage resonant DC/DC converter according to a second embodiment of the invention.

A second embodiment of this invention shown in FIG. 6 includes a voltage resonance circuit constructed by connecting a resonance capacitor 21 in parallel to the primary winding of the transformer 1. The circuit of FIG. 6 is substantially equivalent to that of FIG. 1 with respect to high frequencies.

Figure 7:
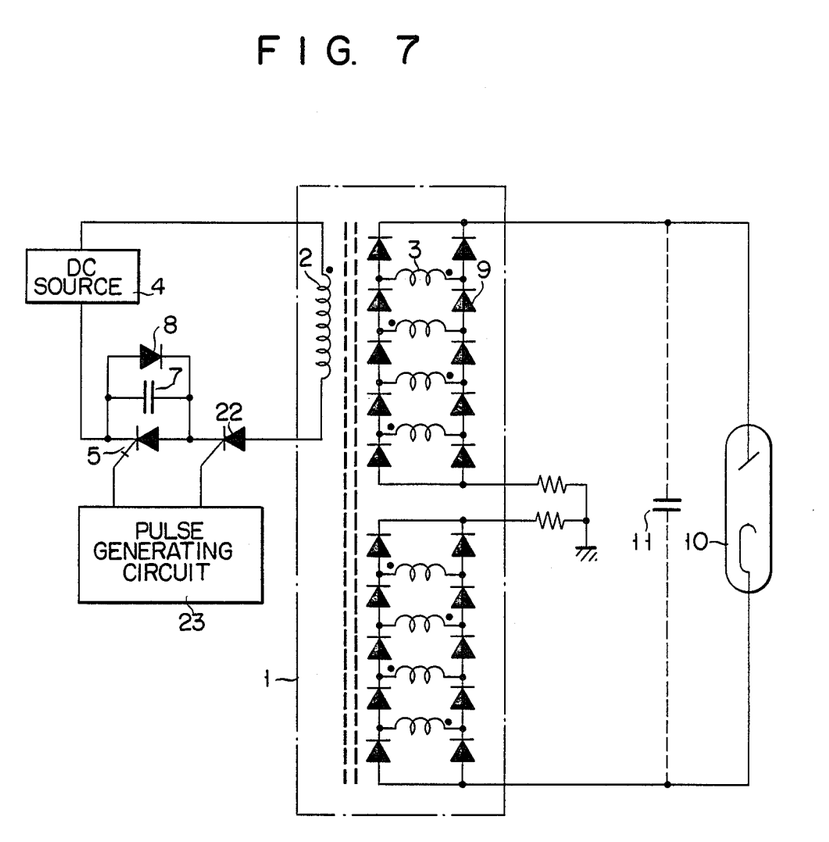
FIG. 7 is a circuit diagram of a high voltage resonant DC/DC converter according to a third embodiment of the invention.

A description is now made, with reference to FIG. 7, of a high voltage generator according to a third embodiment of this invention. A thyristor 22 acting as an auxiliary switching element is connected in series to the resonance capacitor 7 between the primary winding 2 of the transformer 1 and the resonance capacitor 7 shown in FIG. 1. A control pulse generator 23 causes the GTO thyristor 5 acting as a main switch to be intermittently operated for a prescribed period in a prescribed time, thereby enabling the operating time of the thyristor 22 to be controlled as desired, thus ensuring the control of the power magnitude supplied to a load, for example, the X-ray tube 10. The thyristor 22 acting as an auxiliary switching element controls the recharging of the resonance capacitor 7 during the resonance mode, thereby ensuring the control of output power over a broad range.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high voltage resonant DC/DC converter comprising:
    a coreless transformer having primary and secondary windings;
    first switching means connected in series between a DC power source and the primary winding of said transformer for selectively connecting said DC power source to said primary winding;
    switch driving means connected to said first switching means for rendering said first switching means periodically conductive and nonconductive at a predetermined high frequency;
    a voltage resonance capacitor connected in parallel with said first switching means; and
    a rectifier circuit connected to the secondary winding of said transformer for rectifying an output current from the secondary winding of said transformer and for supplying the rectified current to a load;
    wherein said voltage resonance capacitor and said coreless transformer constitute a parallel resonance circuit having a voltage resonant frequency selected close to the frequency of that component of the current supplied to said resonance circuit through said first switching means, which has a greater amplitude than any other component of the current including the fundamental frequency and other harmonics.

2. The converter according to claim 1, wherein said switch driving means comprises pulse generating means for supplying predetermined high frequency pulses to said first switching means.

3. The converter according to claim 1, wherein the secondary winding comprises a plurality of divided windings.

4. The converter according to claim 3, wherein said rectifier circuit comprises a plurality of groups of diodes respectively connected in series, every two diode groups being connected in parallel and comprising the same number of said diodes, and each of the divided secondary windings being connected between a junction of two adjacent diodes of one diode group and a junction of two corresponding adjacent diodes of another diode group connected in parallel with said one diode group.

5. The converter according to claim 1, further comprising:
   second switching means connected in series between said first switching means and the primary winding of said transformer for controlling the connection of said DC power source to said transformer primary winding; and
   second switch driving means for controlling the second switching means to be conductive and nonconductive with a variable timing.

6. The converter according to claim 1, wherein said first switching means comprises a semiconductor switching element acting as a diode.

7. The converter according to claim 6, further comrising a by-pass diode connected with opposite polarity in parallel with said first semiconductor switching element.

8. The converter according to claim 6, wherein said first semiconductor switch element comprises a gate turn-off thyristor.

9. A high voltage resonance DC/DC converter comprising:
   a coreless transformer having primary and secondary windings;
   first switching means connected in series between the primary winding and a DC power source for selectively connecting said DC power source to said primary winding;
   switch driving means connected to said first switching means for rendering said first switching means periodically conductive and nonconductive at a predetermined high frequency;
   a voltage resonance capacitor connected in parallel with the primary winding of said transformer; and
   a rectifier circuit connected to the secondary winding of said transformer for rectifying an output current from said secondary winding and for supplying the recitified current to a load;
   wherein said voltage resonance capacitor and said coreless transformer constitute a parallel resonance circuit having a voltage resonant frequency selected close to the frequency of that component of the current supplied to said resonance circuit through said first switching means, which has a greater amplitude than any other component of the current including the fundamental frequency and other harmonics.

10. The converter according to claim 9, wherein said switch driving means comprises pulse generating means for supplying predetermined high frequency pulses to said first switching means.

11. The converter according to claim 9, wherein the secondary winding comprises a plurality of divided windings.

12. The converter according to claim 11, wherein said rectifier circuit comprising a plurality of groups of diodes respectively connected in series, every two diode groups being connected in parallel and comprising the same number of said diodes, and each of the divided secondary windings being connected between a junction of two adjacent diodes of one diode group and a junction of two corresponding adjacent diodes of another diode group connected in parallel with said one diode group.

13. The converter according to claim 9, further comprising:
   second switching means connected in series between said first switching means and the primary winding of said transformer for controlling the connection of said D.C. power source to said transformer primary winding; and
   second switch driving means for controlling the second switching means to be conductive and nonconductive with a variable timing.

14. The converter according to claim 9, wherein said first switching means comprises a semiconductor switching element acting as a diode.

15. The converter according to claim 14, further comprising a by-pass diode connected with opposite polarity in parallel with said first semiconductor switching element.

16. The converter according to claim 14, wherein said first semiconductor switch element comprises a gate turn-off thyristor.

* * * * *